United States Patent
Jactat (10) Patent No.: US 10,602,352 B2
(45) Date of Patent: Mar. 24, 2020

(54) SECURITY ENHANCEMENTS FOR LTE WLAN AGGREGATION

(71) Applicant: JRD COMMUNICATION INC., Shenzhen, Guangdong (CN)

(72) Inventor: Caroline Jactat, Guangdong (CN)

(73) Assignee: JRD COMMUNICATIONS INC., Shenzhen, Guangdong (CN)

(*) Notice: Subject to any disclaimer, the term of this patent is extended or adjusted under 35 U.S.C. 154(b) by 0 days.

(21) Appl. No.: 16/080,282

(22) PCT Filed: Jun. 7, 2017

(86) PCT No.: PCT/CN2017/087438
§ 371 (c)(1),
(2) Date: Aug. 27, 2018

(87) PCT Pub. No.: WO2018/028288
PCT Pub. Date: Feb. 15, 2018

(65) Prior Publication Data
US 2019/0342752 A1     Nov. 7, 2019

(30) Foreign Application Priority Data
Aug. 11, 2016 (GB) .................................. 1613824.0

(51) Int. Cl.
*H04W 12/00* (2009.01)
*H04W 12/04* (2009.01)
(Continued)

(52) U.S. Cl.
CPC . *H04W 12/0017* (2019.01); *H04W 12/04031* (2019.01); *H04W 84/042* (2013.01); *H04W 84/12* (2013.01); *H04W 88/06* (2013.01)

(58) Field of Classification Search
CPC ............. H04W 80/02; H04W 12/0017; H04W 12/04031; H04W 84/042; H04W 84/12; H04W 84/06
See application file for complete search history.

(56) References Cited

U.S. PATENT DOCUMENTS

2007/0258591 A1    11/2007  Terry et al.
2009/0122762 A1*    5/2009  Kitazoe ................. H04W 12/04
                                                    370/331
2017/0311362 A1*   10/2017  Hong .................... H04W 84/12

FOREIGN PATENT DOCUMENTS

EP    2 584 802 A2    4/2013
GB    2541392 A       2/2017
(Continued)

OTHER PUBLICATIONS

Burbridge, "LTE-WLAN Aggregation (LWA) and LTE WLAN Radio Level Integration with IPsec Tunnel (LWIP)", 3GPP RAN2 WG chair; IEEE meeting in Macao, Mar. 13-18, 2016.
(Continued)

*Primary Examiner* — Brian F Shaw
(74) *Attorney, Agent, or Firm* — Baker & Hostetler LLP (57) ABSTRACT

A method for managing ciphering configurations for LTE WLAN Aggregation includes a source evolved Node B ciphering configuration which is implemented at a mobile device and at a source eNB, for communicating data between the mobile device and the source eNB via a WLAN node. A WLAN ciphering configuration is implemented at the mobile device and at the WLAN node, for communicating data between the mobile device and the source eNB via the WLAN node. In response to determining that the WLAN ciphering configuration has been implemented, a message is transmitted indicating that the WLAN ciphering
(Continued)

configuration has been implemented and at least one action is performed in response to the message.

2 Claims, 7 Drawing Sheets

(51) Int. Cl.
    *H04W 84/04*     (2009.01)
    *H04W 84/12*     (2009.01)
    *H04W 88/06*     (2009.01)

(56)         References Cited

FOREIGN PATENT DOCUMENTS

| WO | 2014/094251 A1 | 6/2014 |
| WO | 2014/100929 A1 | 7/2014 |
| WO | 2016/089264 A1 | 6/2016 |

OTHER PUBLICATIONS

"Support of high data rate 802.11 technologies", 3GPP TSG RAN WG2 Meeting #94, R2-163854, Nanjing, China, May 23-27, 2016.
3GPP TS 33.401 v14.1.0 (Jun. 2016), 3rd Generation Partnership Project; Technical Specification Group Services and System Aspects, 3GPP System Architecture Evolution (SAE), Security architecture (Release 14).
"Mobility optimizations for eLWA", 3GPP TSG-RAN WG2 #93bis, R2-162793, Dubrovnik, Croatia, Apr. 11-15, 2016.
"Mobility optimizations for eLWA", 3GPP TSG-RAN WG2 #94, R2-164141, Nanjing, China, May 23-27, 2016.

\* cited by examiner

SECURITY ENHANCEMENTS FOR LTE WLAN AGGREGATION

CROSS-REFERENCE TO RELATED APPLICATIONS

This application is a National Stage of International patent application PCT/CN2017/087438, filed on Jun. 7, 2017, which claims priority to Great Britain Patent Application No. GB 1613824.0, filed on Aug. 11, 2016, the disclosures of which are incorporated by reference in their entirety.

TECHNICAL FIELD

This disclosure relates to systems and methods for managing ciphering configurations in a system implementing LTE WLAN Aggregation (LWA). More specifically, it relates to security enhancements for LWA.

BACKGROUND

Radio Access Networks (RANs) and Wireless Local Area Networks (WLANs) are both wireless communication technologies. In a cellular RAN, the areas where the network is distributed are covered by cells, each served by at least one base station (commonly known as a NodeB in a 3G network and an eNodeB in an LTE/4G network). Mobile devices, known as User Equipment (UE), located within a cell connect to the telecommunications core network (CN) via the base station of the cell.

WLAN describes a wireless communication system in which coverage is provided over smaller areas. A common example is Wi-Fi, which is a wireless data communication and networking technology, specified by the Institute of Electrical and Electronics Engineers (IEEE) 802.11 family of standards which define the physical layer (PHY) and medium access control (MAC) layer of the Open Systems Interconnection model (OSI Model).

WLAN enabled devices can establish wireless links with WLAN Access points (APs) which then allow Internet access. WLAN enabled devices can be mobile devices such as laptops, personal digital assistants and mobile phones, or fixed devices such as desktops and workstations that are equipped with a WLAN network interface. WLAN systems use the ISM radio band, a portion of the spectrum reserved internationally for industrial, scientific and medical purposes other than telecommunications. No fees or licenses are needed for use of this band of the spectrum.

Wi-Fi, and other non-3GPP standardised radio access technologies, provide radio coverage over relatively small areas, but at relatively high data rates. The use of unrestricted radio spectrum and relatively low-cost equipment for the provided data rates, has led to widespread deployment of WLAN access points. Access points maybe private or public, with many commercial access points being positioned in public locations for use by customers. Access points may be managed and controlled by the cellular network providers/operators ("operator controlled access points"), or may be independent ("non-operator controlled access points").

The 3rd Generation Partnership Project (3GPP) and cellular operators have been able to integrate Wi-Fi into Long-Term Evolution (LTE) networks. This allows the cellular operators to provide better services to users located within indoor premises where cellular coverage is typically poorer (e.g. homes, offices, shopping malls, etc.) where Wi-Fi is usually deployed. Wi-Fi can complement cellular radio networks by providing data services in areas of poor cellular reception. Wi-Fi can complement cellular radio networks by providing enhanced data throughput.

In the course of 3GPP Release 12 specifications, 3GPP has been working on new functionality that would allow a Wi-Fi access point (AP) to connect on the Long Term Evolution (LTE) Core Network. As a result, the core network (CN) operators are able to offer a carrier grade Wi-Fi that allows the cellular subscribers to offload part of their traffic. From radio point of view, the LTE Radio Access Network (more specifically evolved NodeB (eNB)) handles a set of Wi-Fi APs whose broadcast identifiers are provided to the subscriber device on the LTE radio interface. It also requires the device to report Wi-Fi radio measurements so that the LTE RAN can trigger the CN to steer the traffic bearer from one radio access to the other. The functionality is called LTE WLAN interworking.

In the course of Release 13, a further step is taken where the LTE Radio Access Network (instead of the Core Network) controls the offloading to allow the best access network for all or some of the data streams related to an IP application. Namely, LTE data is tunnelled within the WLAN network by the RAN. The WLAN network consists of a WLAN Termination (WT) point that terminates the RAN interface (Xw). The WT controls information for a set of WLAN Access Points. Thisis commonly referred to as LTE WLAN aggregation (LWA).

Figure 1:
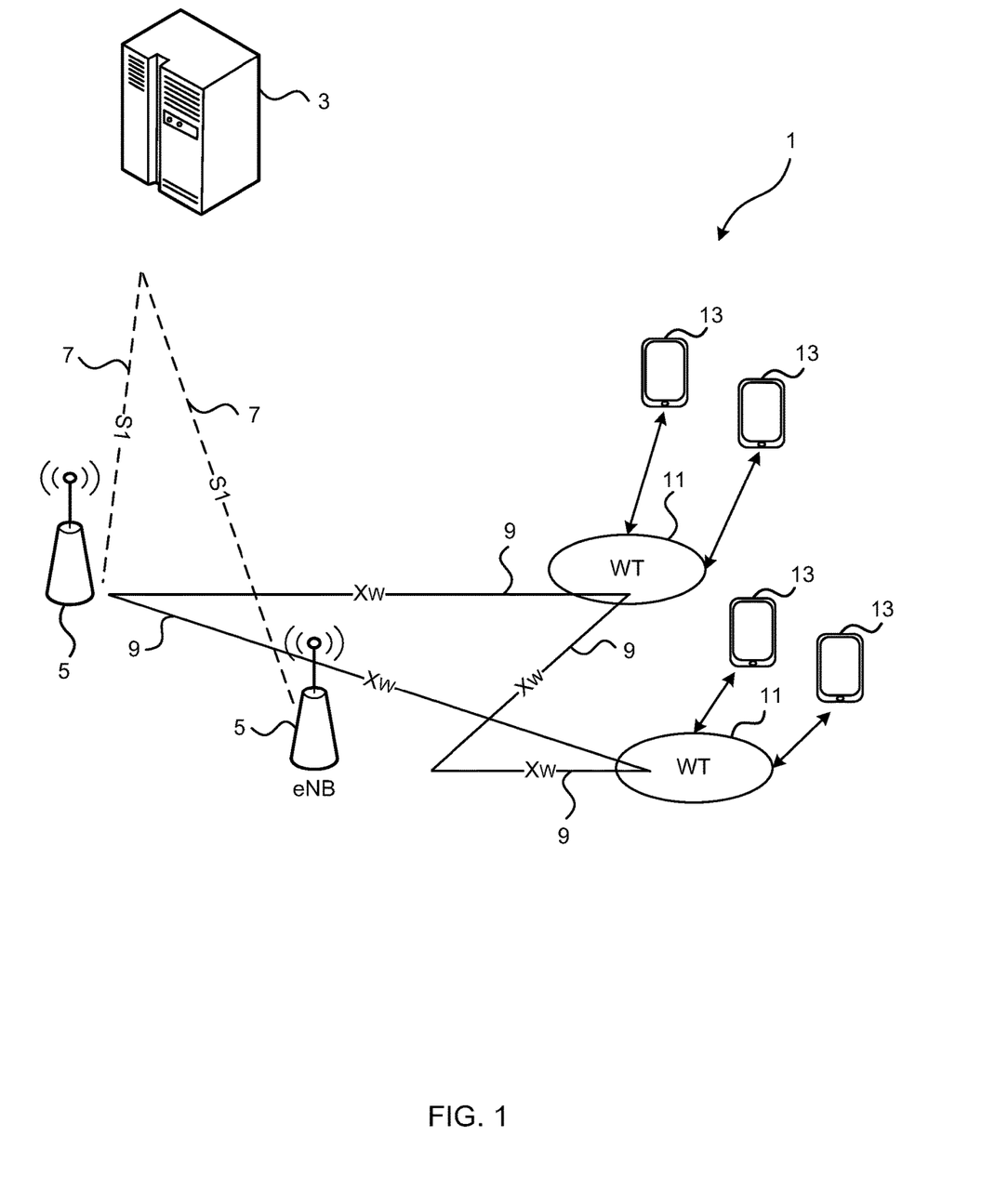
FIG. 1 is a schematic diagram illustrating a basic general architecture of a system implementing LTE WLAN Aggregation (LWA)

FIG. 1 illustrates the basic general architecture of a system 1 implementing LWA. In the system 1 there is a Core Network (CN) 3, which comprises a Mobile Management Entity/Serving Gateway (MME/S-GW). The CN 3 is connected to eNBs 5 via S1 interfaces 7. The eNBs 5 are connected to the WLAN via Xw interfaces 9. Each of the Xw interfaces terminate at a WT 11, and UEs 13 are connected to the WT 11.

There exists a need for a UE 13 to able to operate with Wi-Fi radio access, whilst being able to configure security parameters when it moves between heterogeneous LTE RAN and/or WLAN networks.

Figure 2:
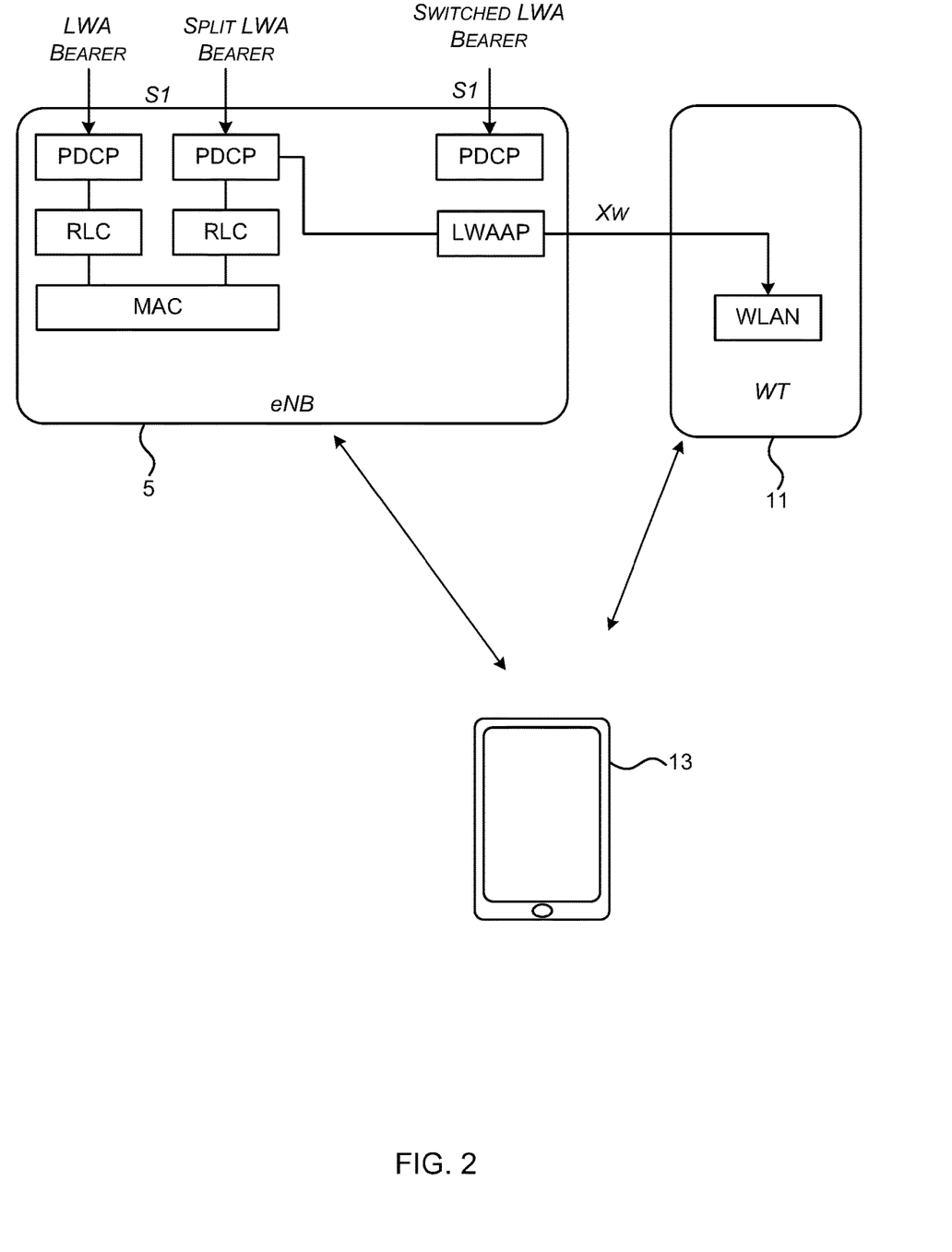
FIG. 2 is a schematic diagram illustrating a radio protocol architecture for a bearer implementing LWA.

FIG. 2 illustrates the radio protocol architecture that a particular bearer channel will use. There are two bearer types for LWA: split LWA bearer and switched LWA bearer. In the switched LWA bearer type offloading is performed per bearer, so that all the Packet Data Convergence Protocol Packet Data Units (PDCP PDUs) are transmitted from the eNB 5 to the UE 13 either via the WLAN or via the RAN.

In the split LWA bearer type offloading is performed per PDCP PDU, so that the PDCP PDUs are transmitted from the eNB 5 to the UE 13 either via the WLAN or the RAN. The eNB 5 can switch the bearer traffic back and forth between the WLAN and the RAN (for all its data flows or part of them), depending on the radio conditions.

In the downlink (DL) direction, for PDUs sent over WLAN in LWA operation, the LWAAP (LWA Access Point) entity in the eNB 5 generates LWA PDU containing a Data Radio Bearer (DRB) identity and the WT uses the LWA EtherType for forwarding the data to the UE 13 over WLAN.

Upon receipt of a PDU from the WT 11, the UE 13 uses the LWA EtherType to determine that the received PDU belongs to an LWA bearer and uses the DRB identity to determine to which LWA bearer the PDU belongs.

In the uplink (UL) direction, for PDUs sent over WLAN in LWA operation, the UE 13 generates LWA PDUs containing a DRB identity and the WT 11 uses the LWA EtherType for forwarding the data to the eNB over WLAN.

Under the 3GPP LTE radio protocol architecture, the upper layer IP data PDUs are ciphered by the PDCP sublayer. However, when these PDCP data PDUs are conveyed over WLAN in LWA operation, additional ciphering is applied by the Wi-Fi layer. Avoiding double encryption can help in reducing UE processing time, power consumption and cost. More specifically, during downlink, LTE hardware supports 1 Gbps maximum, whilst Wi-Fi 802.11ad hardware can support up to 7 Gbps. Thus, in LWA operation, Wi-Fi hardware can forward data 7 times faster than the LTE hardware can process the data. A similar problem can occur during uplink. In this scenario, the LTE hardware can act as a bottleneck in LWA.

Previously, it has been proposed to allow for an absence of PDCP encryption in order to help to alleviate at least some of the speed reductions caused due to the bottleneck problem. However, in this case, the PDCP PDUs should still be encrypted by WLAN.

From a security point of view, since the WLAN network is under control of the LTE network operator, security of the WLAN network is a concern to the LTE network operator. Thus, the security of the WLAN network needs to be considered by the LTE network operator. In light of this, the RAN provides the security key (so called S-KWT to both the WT and the UE) for protecting the WLAN link. Such security key is used as Pairwise Master Key (PMK) defined in IEEE 802.11 specification. The PMK is used to start the four-way handshake on the WLAN link between the UE and the WLAN AP to perform WLAN re-authentication.

Whilst a UE is mobile within the same eNB or different eNB while connected to a WLAN, the RAN can refresh and update the security key (S-KWT) towards the WT. Previously, it has been proposed that the new security key for the WLAN might not be taken into use immediately. In this way, the four-way handshake can be postponed. Therefore, data transfer on the WLAN link would not be interrupted due to WLAN re-authentication whenever a RAN mobility event occurs, especially when the WT is not changed. The WT can decide to take the new security key into use when WLAN data transfer is not on-going.

There is a need for better control of WLAN encryption, particularly in the scenario where no PDCP encryption is used.

When the RAN refreshes or updates a security key, the UE and the RAN might still be receiving PDCP PDUs using an old ciphering configuration. This may be due to packet buffering at the WT. In the current 3GPP specifications, if old PDCP PDUs are received, they would be discarded, since they do not comply with the new ciphering configuration which has already been taken into use. In addition, deciphering of old PDUs would fail.

There exists a need to be able to decipher PDUs associated with an old ciphering configuration, in order to minimise packet discarding and retransmission.

The embodiments described below are not limited to implementations which solve any or all of the disadvantages of known systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an aspect of the invention there is provided a method for managing ciphering configurations for LTE WLAN Aggregation (LWA), the method comprising: implementing a source evolved Node B (eNB) ciphering configuration at a mobile device and at a source eNB, for communicating data between the mobile device and the source eNB via a WLAN node; implementing a WLAN ciphering configuration at the mobile device and at the WLAN node, for communicating data between the mobile device and the source eNB via the WLAN node; determining that the WLAN ciphering configuration has been implemented and, in response, transmitting a message indicating that the WLAN ciphering configuration has been implemented; and in response to the message indicating that the WLAN ciphering configuration has been implemented, performing at least one action.

According to another aspect of the invention there is provided a method for managing ciphering configurations for LTE WLAN Aggregation (LWA), the method comprising: transmitting, to a mobile device, a configuration message indicating a data serial number associated with data; receiving, at the mobile device, the configuration message; and using the data serial number to determine whether to use a first or a second ciphering configuration, for uplink from the mobile device to a WLAN node and/or downlink from the WLAN node to the mobile device; and in response to the determination, using the first or the second ciphering configuration for uplink and/or downlink.

According to another aspect of the invention there is provided a method for managing ciphering configurations for LTE WLAN Aggregation (LWA), the method comprising: implementing a source eNB ciphering configuration at a mobile device and at a source eNB, for communicating data between the mobile device and the source eNB via a WLAN node; implementing a target eNB ciphering configuration at a mobile device and at a target eNB, for communicating data between the mobile device and the target eNB via a WLAN node; and using the target eNB ciphering configuration, at the mobile device, to transmit uplink data intended for receipt at the target eNB via the WLAN node.

According to another aspect of the invention there is provided a method for managing ciphering configurations for LTE WLAN Aggregation (LWA), the method comprising: implementing a source eNB ciphering configuration at a mobile device and at a source eNB, for communicating data between the mobile device and the source eNB via a WLAN node; implementing a target eNB ciphering configuration at the mobile device and at a target eNB, for communicating data between the mobile device and the target eNB via a WLAN node; receiving downlink data from the either the source eNB or the target eNB at the mobile device via the WLAN node; using either the source eNB ciphering configuration or the target eNB ciphering configuration, at the mobile device, to decipher the downlink data.

According to another aspect of the invention there is provided a method for managing ciphering configurations for LTE WLAN Aggregation (LWA), the method comprising: implementing a source eNB ciphering configuration at a mobile device and at a source eNB, for communicating data between the mobile device and the source eNB via a WLAN node; receiving at least a target eNB ciphering configuration and a WLAN ciphering configuration at the mobile device, for communicating data between the mobile device and the target eNB via a WLAN node; handing over communication between the mobile device and the source eNB from the source eNB to the target eNB; and after handing over communication to the target eNB, using the WLAN ciphering configuration at the mobile device or the WLAN node.

According to another aspect of the invention there is provided a method for managing ciphering configurations for LTE WLAN Aggregation (LWA), the method comprising: implementing a source eNB ciphering configuration at a mobile device and at a source eNB, for communicating data between the mobile device and the source eNB via a WLAN node; receiving at least a target eNB enciphering configuration and a WLAN ciphering configuration at the mobile device, for communicating data between the mobile device and the target eNB via the WLAN node; transmitting a message indicating an instruction to end communication of data between the mobile device and the source eNB via the WLAN node.

In some embodiments, a target eNB ciphering configuration can be replaced by a target eNB ciphering configuration which is different from the ciphering configuration implemented at the source eNB, for communicating data between the mobile device and the eNBs via a WLAN node.

In some embodiments, any one of the aspects outlined above and described in greater detail herein may be used in combination with any of the other aspects.

BRIEF DESCRIPTION OF THE DRAWINGS

Embodiments of the invention will be described, by way of example, with reference to the following drawings, in which.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Figure 3:
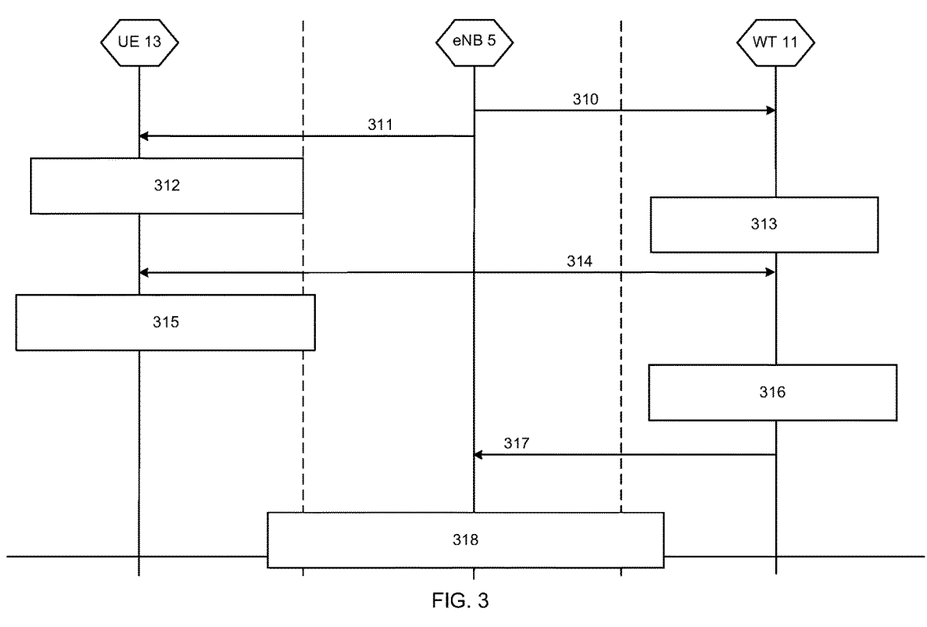
FIG. 3 is a signal flow diagram illustrating a method for managing a ciphering configuration in a LWA system.

FIG. 3 illustrates a method for managing a ciphering configuration in LWA. In this example, the LWA system is of the type illustrated in FIGS. 1 and 2. This method relates to implementing WLAN encryption between the WT 11 and the UE 13 and performing an action based on whether the WLAN encryption has been implemented.

Encryption can introduce delays into a communications system. As explained above in the background, PDCP encryption combined with WLAN encryption may introduce unnecessary delays. However, dispensing with encryption entirely is undesirable because this presents a security issue. In the method described below, once WLAN encryption is activated the PDCP can be deactivated, so that data rates can be increased whilst maintaining a secure system.

In this method initially, a source evolved Node B (eNB) ciphering configuration may be implemented at the UE 13 (mobile device) and at the eNB 5 (source eNB), for communicating data between the UE 13 and the eNB 5 via the WT 11 (WLAN node). In this example, the source eNB ciphering configuration comprises using Packet Data Convergence Protocol (PDCP) encryption at the eNB 5.

In STEP 310, the eNB 5 transmits a security key (S-KWT) to the WT 11, along with the ID of the UE 13 to which the WT 11 is to be connected. In addition, the eNB 5 transmits a message to the WT 11 requesting immediate activation of the S-KWT. This message may be referred to as a scheduling message indicating an implementation schedule for a WLAN ciphering configuration. In this example, the scheduling message indicates that the WLAN ciphering configuration is to be implemented immediately after it is determined that it is possible to implement the WLAN ciphering configuration.

In STEP 311, the eNB 5 transmits the inputs necessary for generating the S-KWT to the UE 13. The information may include LWA bearer configuration information and/or WT counter information.

In STEP 312, in response to receiving the inputs from the eNB 5, the UE 13 generates the S-KWT. Once steps 310-312 have occurred, it is possible to implement the WLAN ciphering configuration.

The UE 13 may inform the WT 11 that the S-KWT has been generated, and the WT 11 may determine that it is possible to implement the WLAN ciphering configuration.

In STEP 313, since the eNB 5 has requested immediate activation of the S-KWT, the WT 11 initiates the WLAN authentication procedure (IEEE 802.11 four-way handshake), for the WT 11 and the UE 13 to connect with one another.

In STEP 314, the UE 13 and the WT 11 conduct the WLAN authentication procedure (IEEE 802.11 four-way handshake). In STEP 315, the UE 13 takes the S-KWT, which was generated in STEP 312, into use. Thus, STEPS 314 and 315 implement a WLAN ciphering configuration at the UE 13 (mobile device) and at the WT 11 (WLAN node), for communicating data between the UE 13 and the eNB 5 via the WT 11. In this example, the WLAN ciphering configuration comprises using WLAN encryption at the WLAN node.

In STEP 316, the WT 11 checks whether the S-KWT has been taken into use. Thus, it is determined that the WLAN ciphering configuration has been implemented.

In STEP 317, the WT 11 sends a message to the eNB 5 indicating whether the S-KWT has been taken into use or not. Thus, the WT 11 transmits a message indicating that the WLAN ciphering configuration has been implemented. In response to the message indicating that the S-KWT has been taken into use, an encryption scheme may be deactivated at the eNB 5.

In STEP 318, the eNB 5 performs at least one action in response to the indication received from the WT 11 indicating whether the S-KWT has been taken into use or not. If the S-KWT has not been taken into use the eNB 5 may continue to use PDCP ciphering, or in other words deactivating PDCP encryption at the eNB 5 is prevented. However, if the S-KWT has been taken into use the eNB 5 may deactivate PDCP ciphering.

Figure 4:
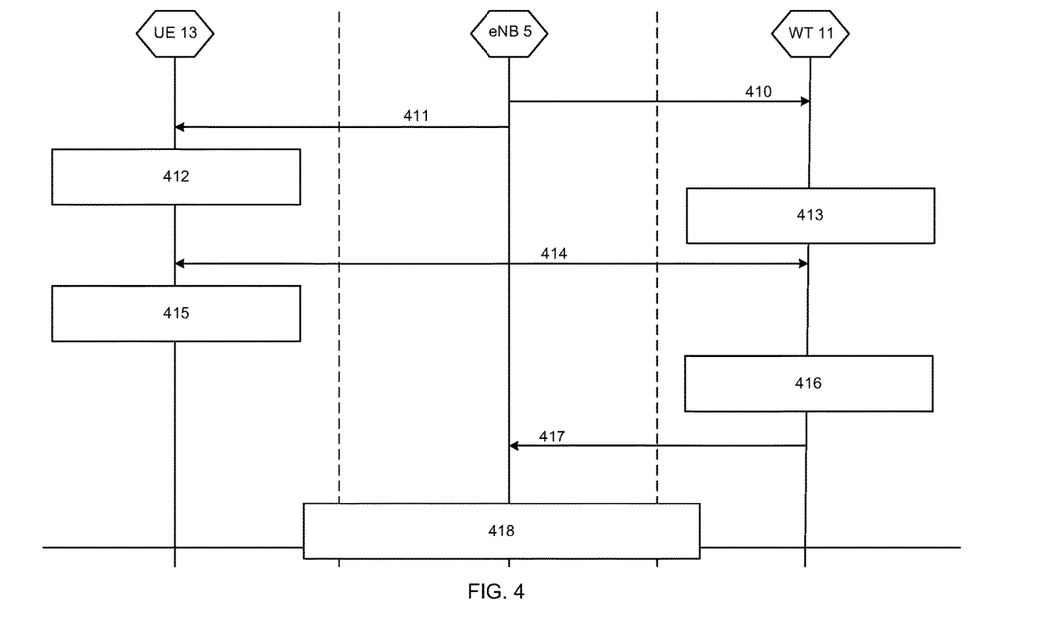
FIG. 4 is a signal flow diagram illustrating an alternative method for managing a ciphering configuration in a LWA system.

Referring to FIG. 4, there is an alternative method for managing a ciphering configuration in a LWA system. In this example, the LWA system is of the type illustrated in FIGS. 1 and 2. Again, this method relates to implementing WLAN encryption between the WT 11 and the UE 13 and performing an action based on whether the WLAN encryption has been implemented.

In the method described above with reference to FIG. 3 it may be undesirable to activate WLAN encryption immediately. For instance, it may be undesirable to activate WLAN encryption whilst data transfer is on-going. In this method, the initiation of WLAN encryption can be postponed in order to help to overcome this problem.

In STEP 410, the eNB 5 transmits a security key (S-KWT) to the WT 11, along with the ID of the UE 13 to which the WT 11 is to be connected. STEP 410 is similar to STEP 310 as described above with reference to FIG. 3. However, in STEP 410, the eNB 5 does not transmit a message to the WT 11 requesting immediate activation of the S-KWT. Instead, the eNB 5 transmits a message to the WT 11 indicating that the S-KWT should be activated at a later time. This message may be referred to as a scheduling message indicating an implementation schedule for a WLAN ciphering configuration.

In this example, the scheduling message indicates that implementing the WLAN ciphering configuration is to be delayed.

In STEP 411, as in STEP 311 as described above with reference to FIG. 3, the eNB 5 transmits the inputs necessary for generating the S-KWT to the UE 13. The information may include LWA bearer configuration information and/or WT counter information.

In STEP 412, as in STEP 312 as described above with reference to FIG. 3, in response to receiving the inputs from the eNB 5, the UE 13 generates the S-KWT.

In STEP 413, at a time chosen by the WLAN, the WT 11 decides to initiate the WLAN authentication procedure (IEEE 802.11 four-way handshake). Thus, the WLAN ciphering configuration is implemented after a delay in response to the scheduling message. In one example, the WLAN decides to initiate the WLAN authentication procedure when a pause in data transfer is detected.

In STEP 414, the UE 13 and the WT 11 conduct the WLAN authentication procedure (IEEE 802.11 four-way handshake).

In STEP 415, the UE 13 takes the S-KWT, which was generated in STEP 412, into use.

In STEP 416, the WT 11 checks whether the S-KWT has been taken into use.

In STEP 417, the WT 11 sends a message to the eNB 5 indicating whether the S-KWT has been taken into use or not.

In STEP 418, the eNB 5 performs at least one action in response to the indication. If the S-KWT has not been taken into use the eNB 5 may continue to use PDCP ciphering. However, if the S-KWT has been taken into use the eNB 5 may deactivate PDCP ciphering.

Figure 5:
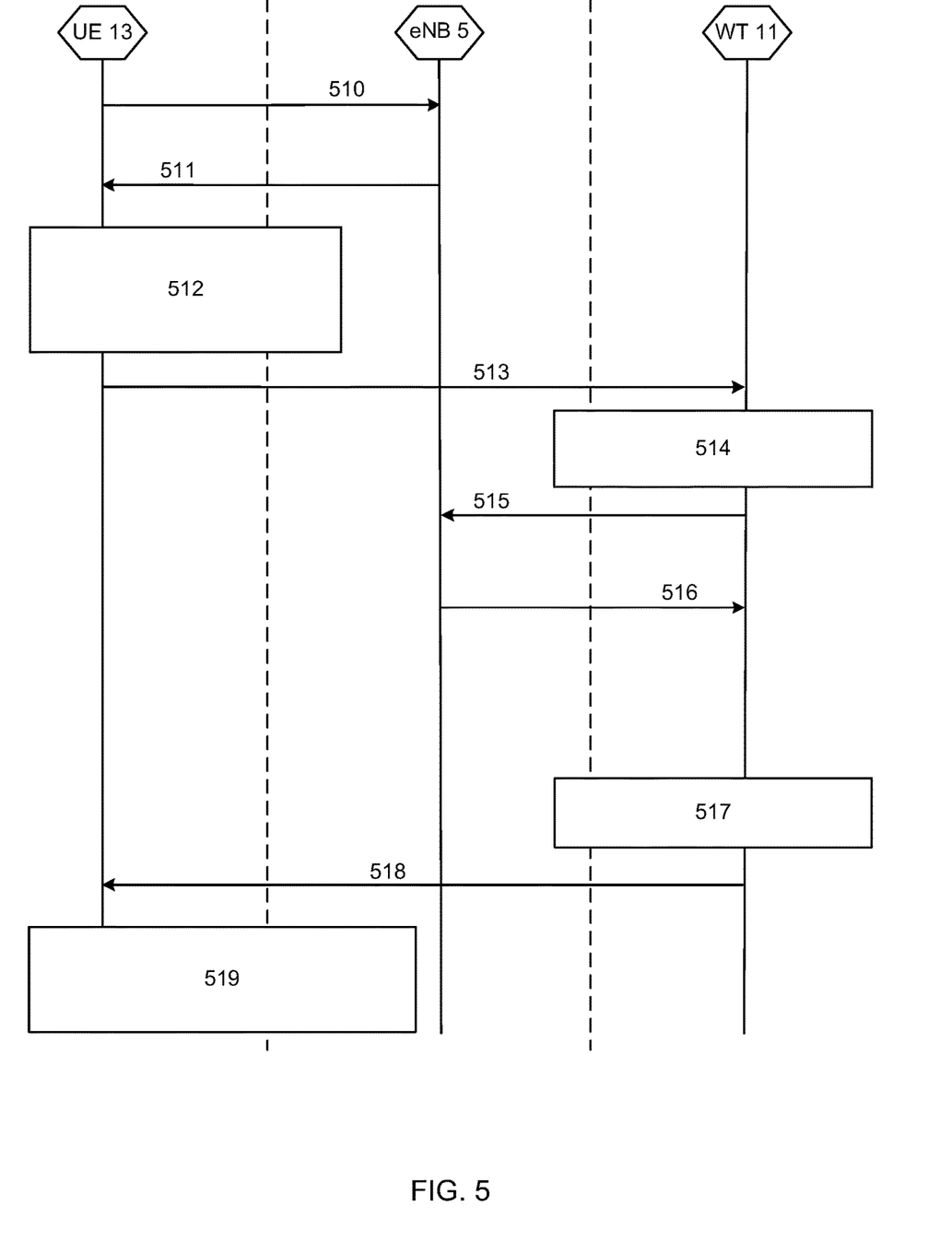
FIG. 5 is a signal flow diagram illustrating a method for managing different ciphering configurations in a LWA system.

Referring to FIG. 5, there is a method for managing different ciphering configurations in a LWA system. Again, in this example, the LWA system is of the type illustrated in FIGS. 1 and 2. In addition, this method may be used in conjunction with the method in FIG. 3 or the method in FIG. 4. This method relates to the problem in LWA where a UE 13 is using an initial ciphering configuration (or first ciphering configuration) and the ciphering configuration is changed to a new ciphering configuration (or second ciphering configuration). In this situation the initial ciphering configuration will become "out-of-date".

In this case, the UE 13 may receive or transmit data relating to the "out-of-date" ciphering configuration and may receive or transmit data relating to the "new" ciphering configuration. For instance, the UE 13 may receive "old" data that has been buffered at the WT 11. The method described below allows data associated with the "out-of-date" and the "new" ciphering configurations to be deciphered without encountering messaging failures.

In STEP 510, the UE 13 transmits a message to the eNB 5 indicating that it supports the functionality necessary to implement the method described below.

In STEP 511, in response to the message received in STEP 510, the eNB 5 configures the UE 13 to apply a ciphering configuration related to the security enhancements for the LWA bearer. This ciphering configuration may be referred to as the "new" ciphering configuration in comparison to the initial ciphering configuration, which may be referred to as the "out-of-date" ciphering configuration.

The RAN can trigger the configuration when the UE 13 accesses a WLAN network supporting increased data rate. In another example, the configuration can be triggered based on the WLAN data rate as perceived by the eNB 5. The perceived data rate may be based on information received from UE 13 or WT 11.

In STEP 511, the eNB 5 transmits a configuration message which may include information regarding the bearer identity, the direction of communication (whether the configuration message relates to uplink and/or downlink) and/or the ciphering status (ON/OFF), or in other words information regarding a ciphering configuration at the WT 11. In addition, the message may indicate the Uplink Packet Data Convergence Protocol Serial Number (UL PDCP SN) and/or the Downlink Packet Data Convergence Protocol Serial Number (DL PDCP SN) from which the ciphering configuration applies. Thus, the eNB 5 transmits, to the UE 13, a configuration message indicating a data serial number associated with data.

In STEP 512, the information from the configuration message is stored at the UE 13.

In STEP 513, during uplink communications, if the UE 13 needs to transmit an UL PDCP SN which is higher than the one received in the configuration, then the UE 13 does apply the"new" configuration received in STEP 511. Alternatively, during uplink communications, if the UE 13 needs to transmit an UL PDCP SN which is lower than the one received in the configuration, then the UE 13 does not apply the configuration received in STEP 512. Instead, the UE 13 applies the "out-of-date" ciphering configuration. In this way, the UE 13 uses the data serial number to determine whether to use a first or a second ciphering configuration, for uplink from the mobile device to the WLAN node and/or downlink from the WLAN node to the mobile device. In response to the determination, the UE 13 uses the first or the second ciphering configuration for uplink and/or downlink In STEP 514, due to LWA Ethertype set in the data PDU over WLAN, the WLAN determines that the PDU is an LWA PDU.

In STEP 515 the WT 11 transmits the WLAN PDU to the eNB 5, based on the determination in STEP 514.

In STEP 516, during downlink communications, the eNB 5 transmits a WLAN PDU to the WT 11. This WLAN PDU is intended to be forwarded to the UE 13.

In STEP 517, due to the LWA Ethertype set in the data PDU over WLAN, the WLAN infers that the PDU is an LWA PDU.

In STEP 518, the WT 11 transmits the WLAN PDU to the UE 5 based on the determination in STEP 517.

In STEP 519, upon receipt of the LWA PDU, the UE 13 checks the contents of the DL PDCP SN to be able to decipher the PDCP PDU. If the DL PDCP SN is higher than the DL PDCP SN received in STEP 511, then the UE 13 does apply the configuration received in STEP 511. Alternatively, if the DL PDCP SN is lower than the DL PDCP SN received in STEP 511, then the UE 13 does not apply the configuration received in STEP 512.

In case the security configuration change for LWA bearer configuration is received as part of an intra/inter RAN mobility event (RRCConnectionReconfiguration message including mobility Information Element), the UE would still apply legacy behaviour (i.e. apply new configuration immediately to perform retransmission of unacked PDCP PDUs, use new configuration to decipher downlink PDCP PDUs transmission) for non LWA bearers but not for LWA bearers.

For non LWA bearers (whose traffic does not transit via WLAN but directly between the UE and eNB), upon receipt of the target eNB configuration (the source eNB would have stopped transmission with the UE), the legacy UE removes the source eNB configuration, applies the target eNB configuration immediately to perform uplink retransmission of unacked PDCP PDUs and to perform deciphering of downlink PDCP PDUs.

However in the context of LWA, potential buffering of source eNB configuration downlink PDCP PDUs by the WT might occur. Then, upon receipt of the target eNB configuration, the UE should be able to retain and apply the source eNB configuration for a while i.e. the UE should not remove it immediately. As a consequence, the UE would be able to use the source eNB configuration to perform deciphering of downlink PDCP PDUs (from the source eNB).

Figure 6:
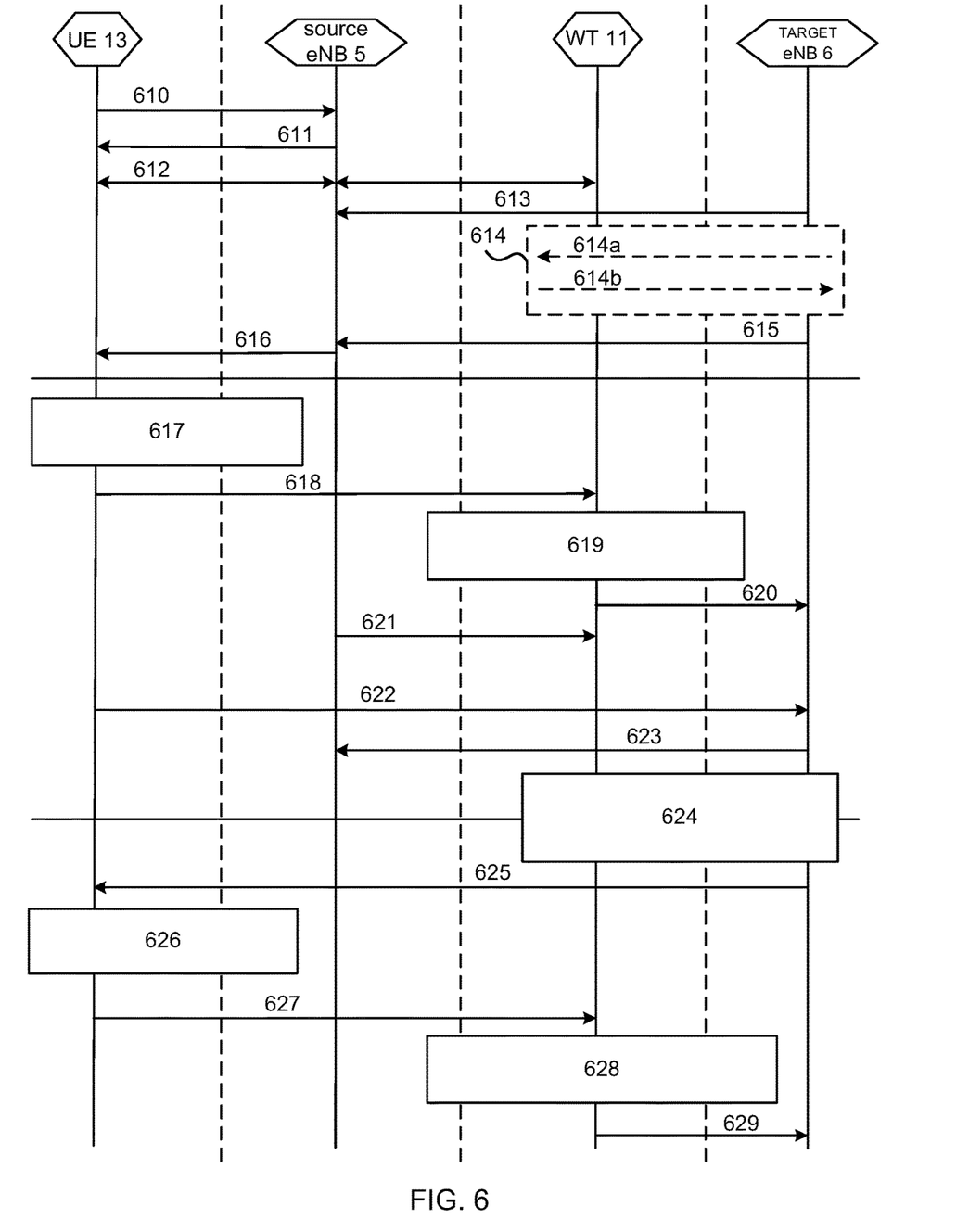
FIG. 6 is a signal flow diagram illustrating a method for managing different ciphering configurations for uplink communications in a LWA system where a UE moves between two eNBs.

Referring to FIG. 6, there is a method for managing different ciphering configurations for uplink communications in a LWA system where a UE moves between two eNBs (a source eNB and a target eNB). Again, in this example, the LWA system is of the type illustrated in FIGS. 1 and 2. In addition, this method may be used in conjunction with any of the methods described above.

The problem with managing different ciphering configurations, which was discussed previously in relation to the method described with reference to FIG. 5, can be exacerbated when a UE 13 moves between a source and a target eNB. In this case different ciphering configurations are required for the source and the target eNBs. The method described below helps to alleviate some of these problems for uplink communications.

In STEP 610, the UE 13 transmits a message to the eNB 5 indicating that it supports the functionality necessary to implement the method described below.

In STEP 611, the eNB 5 transmits a message to the UE 13, which configures communication between the source eNB 5 and the UE 13.

In STEP 612, LWA data transfer occurs between the UE 13, WT 11 and eNB 5.

In STEP 613, before the UE 13 moves from a first eNB 5 (source eNB) to a second eNB 6 (target eNB), the source eNB 5 forwards UE 13 context information to the target eNB 6 using a 'Handover Request' message.

In STEP 614, the target eNB 6 triggers the WT 11 addition procedure, and in STEP 614a the target eNB 6 transmits a WT addition request to the WT 11. This request may include the UE ID and the LWA information. In STEP 614b, the WT 11 transmits a WT addition acknowledgement message to the target eNB 6. In this way, a target eNB ciphering configuration is implemented at the UE 13 and at a target eNB 6, for communicating data between the UE 13 and the target eNB 6 via the WT 11.

In this case, the WT 11 is connected to the source eNB 5 and the target eNB 6 simultaneously. Therefore, in STEP 614b the target eNB 6 requests the UE 13 to set a "target/source configuration indication" related to the configuration used at the target eNB 5, along with the transmission of the LWA PDU.

The "target/source configuration" allows for uplink data transmissions from the UE 13 to be routed towards the correct eNB (either the source eNB 5 or the target eNB 6) by the WT 11. Further, this means that downlink data transmission from the source eNB 5 buffered at the WT 11 can be still deciphered by the UE 13.

In this example, the "target/source configuration" includes an indication that a target eNB ciphering configuration and a source eNB ciphering configuration is to be used. The target eNB ciphering configuration is used at the UE 13 to transmit uplink data intended for receipt at the target eNB 6 via the WT 11. The source eNB ciphering configuration is used at the UE 13 to transmit uplink data intended for receipt at the source eNB 5 via the WT 11.

In STEP 615, the target eNB 6 transmits a Handover Request Acknowledgement to the source eNB 5.

In STEP 616, the source eNB 5 transmits a message to the UE 13 indicating the LWA bearer configuration. This message may comprise the WT counter information at that moment, which marks the initiation of the handover mobility procedure. Then, in STEP 622 (described below), the UE 13 performs the WLAN authentication procedure (IEEE 802.11 four-way handshake) after the handover mobility procedure has been completed. This is advantageous because, if the handover procedure fails, it is possible to avoid having to perform the WLAN procedure again based on the WT counter information previously provided by the source eNB 5 at STEP 611.

In STEP 617, the UE 13 receives and stores the "target/source configuration indication", which was set in STEP 614b, for further use in LWA PDCP data uplink transmission. The "target/source configuration indication" informs the UE 13 that, for LWA bearers, the uplink PDCP data transmission over WLAN should include the "target/source configuration indication".

In STEP 618, due to receipt of the handover message in STEP 616, the UE 13 is no more connected to the source eNB 5. Thus, any LWA PDCP PDU data uplink is intended for the target eNB 5. In this STEP, the UE 13 has set the "target/source configuration indication" for the transmission of the LWA PDU for routing purpose at the WT 11. Preferably, this indication can be set at the transmission of the only first LWA PDU using the target configuration. The advantage is to further avoid to unset the "New configuration indication" at STEP 624.

In STEP 619, due to the LWA Ethertype set in the data PDU transmitted via WLAN, the WLAN determines that the PDU is an LWA PDU. In addition, due to the "target/source Configuration" set in the LWA PDU, the WLAN determines that the PDU has to be forwarded to the target eNB 6. As long as this indication has been received, the WLAN can determine that any subsequent LWA PDU received from the UE has to be forwarded to the target eNB 6 from now onwards whatever subsequent LWA PDU includes the indication or not.

In STEP 620, the WT 11 forwards the PDU to the target eNB 6.

In STEP 621, the source eNB 5 triggers the release of the UE LWA context as set by the source eNB 5 in the WT 11. STEP 621 can be performed along with STEP 616. The advantage of this action is to minimize the duration during which the WT 11 remains connected with both the source eNB 5 and the target eNB 6 by allowing early disconnection of the source eNB 5. Thus, the UE 13 setting of the "target/source configuration indication" for the transmission of the LWA PDU for routing purpose at the WT 11 at STEP 618 can be avoided.

In STEP 622, the UE 13 transmits a message to the target eNB 6 indicating that the RRC Connection reconfiguration for handover is complete. Then, the target eNB 6 transmits a WT Modification Request message to the WT 11 indicating the S-KWT. Thus, the WT 11 (WLAN node) can perform the WLAN authentication procedure (IEEE 802.11 four-way handshake) after the handover mobility procedure completion in STEP 622. This is advantageous because, if the handover procedure fails and the WT has already started this procedure in STEP 614a, it is possible to avoid having to perform this WLAN procedure again based on the S-KWT information previously provided by the source eNB 5 before STEP 611.

In STEP 623, now that the UE 13 is connected to the target eNB 6, the target eNB 6 triggers UE 13 context release towards the source eNB 5. Thus, the WT 11 is no longer connected to both the source eNB 5 and the target eNB 6 simultaneously.

In STEP 624, the target eNB 6 considers that the UE 13 connection with the source eNB 5 is current no longer. Thus, the UE 13 will not be performing uplink transmission with both the source eNB 5 and the target eNB 6 via the WT 11. In this STEP, the target eNB 6 requests the UE 13 to revert to usual LWA PDU uplink transmission procedure by indicating to unset the "New configuration indication". Now, the indication set in STEP 617 is deactivated.

In STEP 625, the target eNB 6 transmits a message to the UE 13, which receives the above indication from the target eNB for further use in LWA PDCP data uplink transmission.

In STEP 626, the received indication means that, for the LWA bearers, the uplink PDCP data transmission over WLAN shall not include the "target/source configuration indication".

In STEP 627, during uplink, the UE 13 transmits LTE data embedded in WLAN packets to the WT 11.

In STEP 628, due to LWA Ethertype set in the data PDU over WLAN, the WLAN determines that the PDU is an LWA PDU intended for the currently connected eNB, which in this case is the target eNB 6.

In STEP 629, the WT 11 forwards the PDU to the target eNB 6.

At STEPS 627-629, the usual LWA PDU uplink transmission procedure occurs where the WT infers the inbound data from the UE relates to an LWA PDU to be forwarded to the only connected-to eNB (the target eNB) based on the LWA Ethertype in the data PDU over WLAN.

Figure 7:
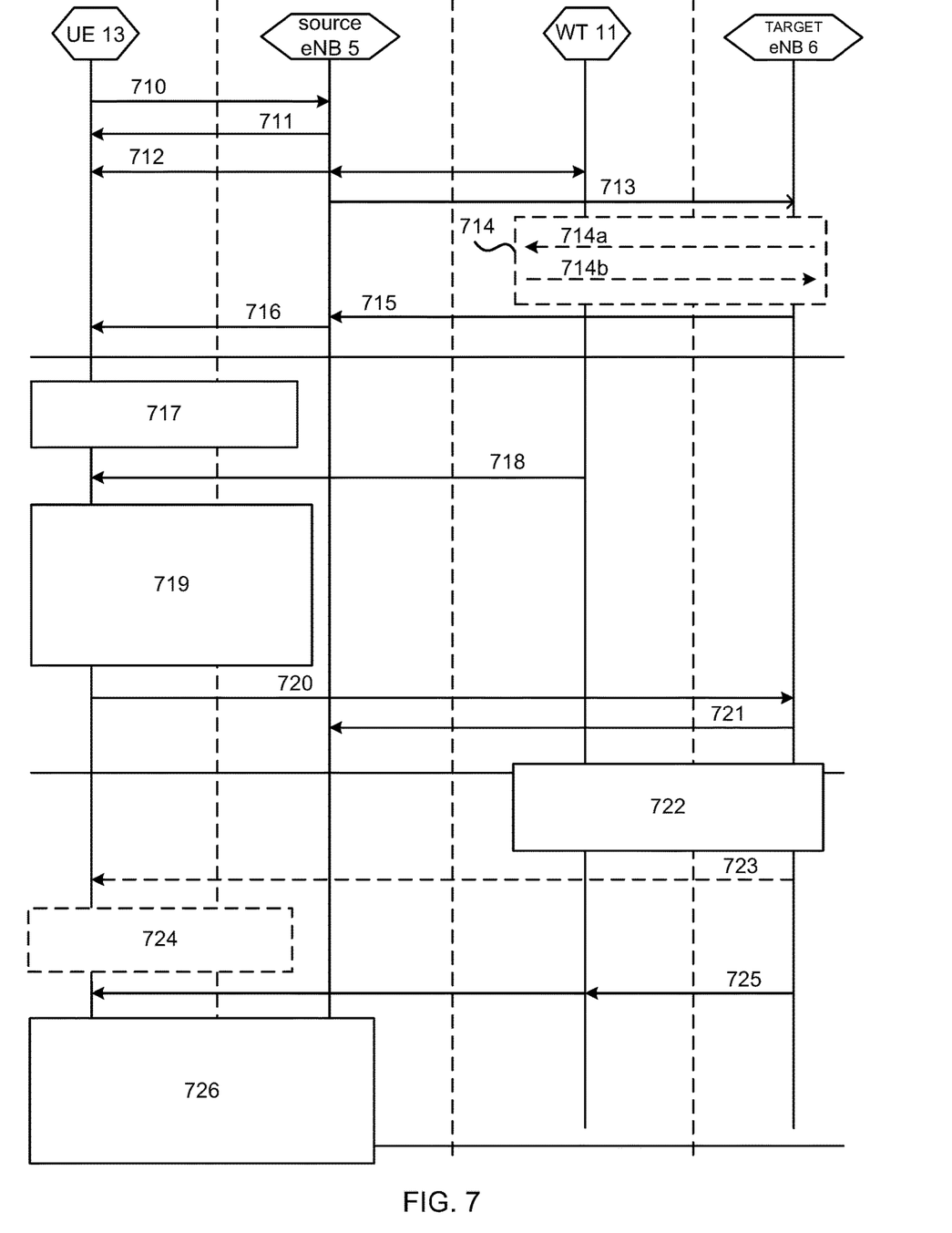
FIG. 7 is a signal flow diagram illustrating a method for managing different ciphering configurations for downlink communications in a LWA system where a UE moves between two eNBs.

Referring to FIG. 7, there is a method for managing different ciphering configurations for downlink communications in a LWA system where a UE moves between two eNBs. The method described below helps to alleviate some of the problems associated with managing different ciphering configurations, when a UE 13 moves between a source and a target eNB, for downlink communications.

STEPS 710-717 of the method in FIG. 7 are the same as STEPS 610-617 in FIG. 6.

In STEP 718, the WT 11 transmits downlink data, which was received from the source eNB 5 before the handover procedure. In this case, the UE 13 receives an LWA PDCP PDU, and the UE 13 cannot determine whether the LWA PDCP PDU was transmitted by the source eNB 5 or the target eNB 6.

In STEP 719, UE 13 performs deciphering algorithm. Initially, the UE 13 attempts to decipher the data using the source eNB 5 ciphering configuration. If the deciphering fails, then the UE 13 performs deciphering using the target eNB enciphering configuration 6. If this second deciphering succeeds, then the UE 13 determines that any PDCP data including a PDCP SN onwards would be using the target eNB 6 configuration.

In the case, where the deciphering succeeds with the target eNB ciphering configuration, then the UE 13 stores the PDCP SN at which the deciphering was successful. This PDCP SN can be used as a "tag" to indicate the earliest PDCP SN where the target configuration should be used.

At STEP 720, the UE 13 sends a message to the target eNB 6 that the Handover Procedure is complete. Then, the target eNB 6 transmits a WT Modification Request message to the WT 11 indicating the S-KWT. Thus, the WT 11 (WLAN node) can perform the WLAN authentication procedure (IEEE 802.11 four-way handshake) after the handover mobility procedure has completed in this STEP. This avoids having to perform this WLAN procedure again, if the handover procedure fails, based on the S-KWT information previously provided by the source eNB 5 before STEP 711.

In STEP 721, now that the UE 13 is connected to the target eNB 6, the target eNB 6 triggers UE 13 context release towards the source eNB 6. Now the UE 13 is no longer connected to the source eNB 5, the WT 11 is no longer connected to source eNB 5 and the target eNB 6 simultaneously.

In STEP 722 the target eNB 6 considers that the UE 13 connection with the source eNB 6 is no longer current. Thus, the UE 13 will not be performing downlink transmission with both the source eNB 5 and the target eNB 6. Therefore, it can be decided to deactivate the deciphering algorithm set up in STEP 716.

In STEP 723, the target eNB 5 requests the UE 13 to revert to the usual LWA PDU downlink transmission procedure by indicating that the deciphering algorithm set up in STEP 716 should be deactivated.

In STEP 724, the UE 13 receives the above indication from the target eNB 6 for further use in LWA PDCP data downlink transmission. Here, the received indication means that for the LWA bearers the UE can expect to receive the PDCP PDUs from the target eNB 6. Therefore, the UE 13 no longer performs the deciphering procedure in STEP 719. In addition, the UE 13 can remove the ciphering configuration relating to the source eNB 5.

In STEP 725, downlink LWA PDU data is transmitted from the target eNB 6 to the UE 13.

In STEP 726, the UE 13 no longer applies the ciphering configuration associated with the source eNB 5. In this step, upon receipt of LWA PDU data, the UE 13 applies the ciphering configuration for the target eNB 6.

In one hypothetical situation, the UE 13 may not have performed STEP 724, where the UE 13 decides to no longer perform the deciphering procedure in STEP 719. In this situation, if the received PDCP SN is older than the PDCP SN "tag", the target eNB 6 ciphering configuration is used. However, if the received PDCP SN is newer than the PDCP SN "tag", the source eNB 5 ciphering configuration is used.

In another hypothetical example, the UE 13 is not provided with the indication in STEP 724. In this case, the UE performs the deciphering algorithm in STEP 719.

Those skilled in the art will appreciate that methods according to the embodiments may be carried out by software computer programs, hardware, or a combination of software and hardware.

These methods are provided by way of example only. The disclosure of this application is not restricted by the specific combination of steps shown in the figures, and described herein, but includes any appropriate subsets or combinations of steps performed in any appropriate order. Sections of the method may be performed in parallel.

The term 'user equipment' (UE) is used herein to refer to any device with processing and telecommunication capability such that it can perform the methods according to the embodiments of the present invention. Those skilled in the art will realize that such processing and telecommunication capabilities can be incorporated into many different devices and therefore the term 'user equipment' includes mobile telephones, personal digital assistants, PCs and many other devices.

Although in the embodiments and examples described above, only LTE and Wi-Fi are described as exemplary radio access technologies, it will be appreciated that the method of the embodiments of the present invention apply to any other radio access technologies without losing the effect sought.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

The invention claimed is:

1. A method for managing ciphering configurations for LTE WLAN Aggregation (LWA), the method comprising:
   an eNodeB configuring a mobile device to apply a new ciphering configuration which is different to a previous ciphering configuration;
   transmitting from an eNodeB to the mobile device, a control indication including a data serial number associated with data;
   receiving, at the mobile device, the control indication; and
   at the mobile device using the data serial number to determine whether to use the new ciphering configuration or the previous ciphering configuration, for uplink from the mobile device to a WLAN node and/or downlink from the WLAN node to the mobile device; wherein,
   during uplink communications,
      if the mobile device needs to transmit an uplink data serial number, which is higher than a value in the control indication, then the mobile device uses the new ciphering configuration;
      if the mobile device needs to transmit an uplink data serial number which is lower than the value in the control indication, then the mobile device uses the previous ciphering configuration;
      and/or
   during downlink communications,
      if the mobile device receives data which downlink data serial number is higher than the value in the control indication, then the mobile device uses the new ciphering configuration;
      if the mobile device receives data which downlink data serial number which is lower than the value in the control indication, then the mobile device uses the previous ciphering configuration.

2. The method according to claim 1, wherein the control indication is a configuration message.

* * * * *